W. S. HADAWAY, Jr.
ELECTRIC SOLDERING IRON.
APPLICATION FILED APR. 10, 1911.
1,075,473.
Patented Oct. 14, 1913.
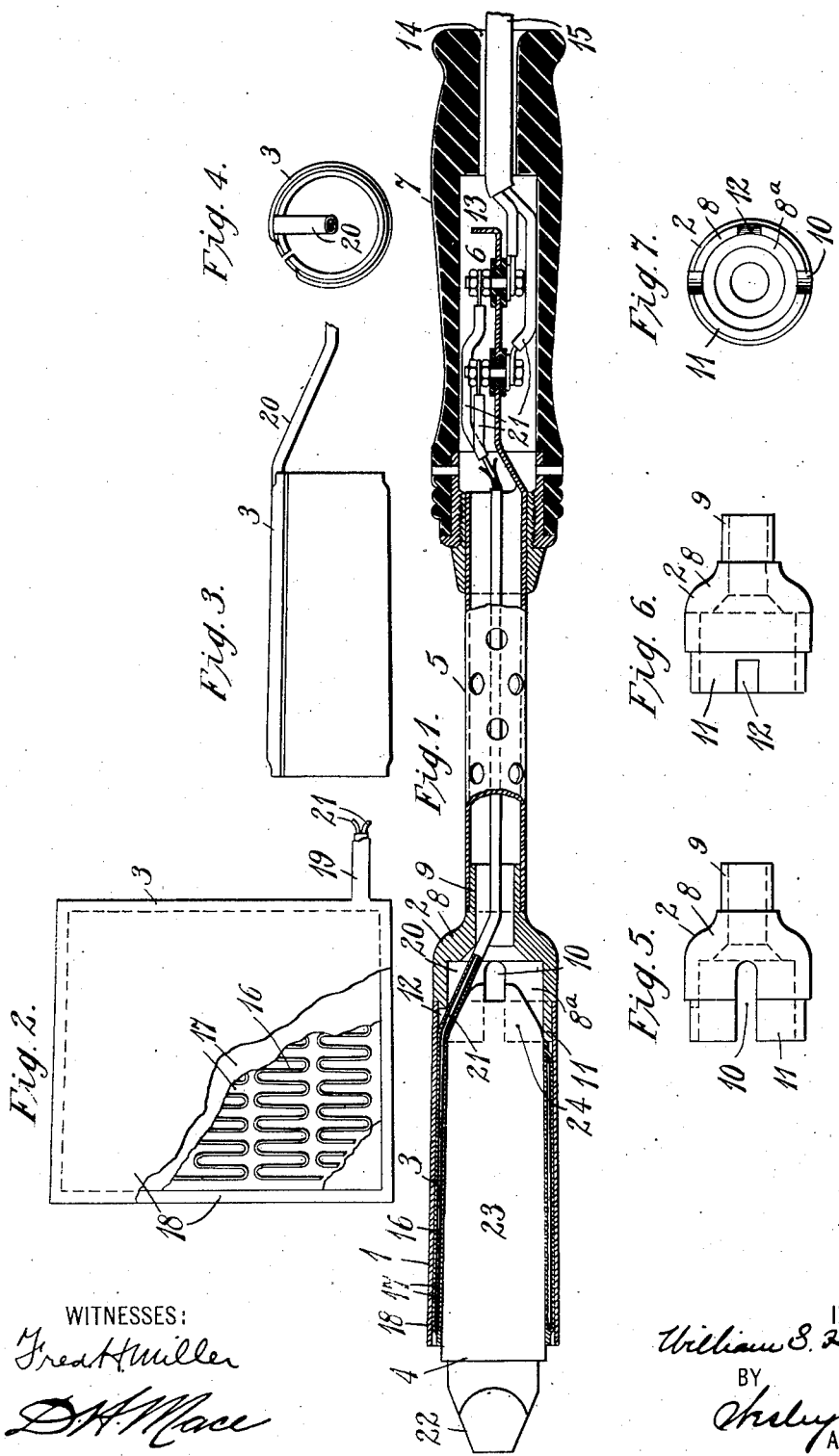
WITNESSES:
INVENTOR
BY
ATTORNEY

UNITED STATES PATENT OFFICE.

WILLIAM S. HADAWAY, JR., OF EAST ORANGE, NEW JERSEY, ASSIGNOR TO WESTING-HOUSE ELECTRIC AND MANUFACTURING COMPANY, A CORPORATION OF PENNSYLVANIA.

ELECTRIC SOLDERING-IRON.

1,075,473.

Specification of Letters Patent.

Patented Oct. 14, 1913.

Application filed April 10, 1911. Serial No. 620,172.

*To all whom it may concern:*

Be it known that I, WILLIAM S. HADAWAY, Jr., a citizen of the United States, and a resident of East Orange, in the county of Essex and State of New Jersey, have invented a new and useful Improvement in Electric Soldering-Irons, of which the following is a specification.

My invention relates to electric soldering irons, and it has for its object to provide a device of this character which shall be simple and durable in construction, and effective in operation, and one that shall embody means whereby an exceedingly large heating area is exposed in intimate contact with the soldering tip.

According to my invention, I provide an electric soldering iron having an incased type of heater which is substantially tubular in form and is adapted to fit tightly into a tapered receiving member.

The soldering tip is of comparatively large proportions and hence, offers adequate heat storage capacity. Moreover, the shank of the tip is tapered and is adapted to be driven into the tubular heater unit, thereby creating a considerable pressure upon the unit which results in increased efficiency. It is manifest, therefore, that practically all of the tapered shank is in intimate contact with the heater unit, so that nearly all of the heat produced is absorbed and utilized by the tip.

Additional means are provided whereby the soldering tip may be readily removed and, for this purpose a key-way is provided through the receiving member at the base of the tip. By inserting a key or wedge, the tip may be easily driven out in a well-known manner, similar to that employed in machine drills and the like. After the removal of the soldering tip, the heater as a single unit may be withdrawn, thus facilitating the renewal of defective parts. Furthermore, the heater unit leads are carried in the shaft of the implement and the terminal connections are effected within an insulating handle. In general, a particularly simple, compact and useful device is provided, which is extremely well adapted for performance of its intended functions, ready inspection and maintenance in good operating condition.

My invention is illustrated in the accompanying drawing, in which—

Figure 1 is a view, partially in side elevation and partially in vertical section, of a device constructed in accordance with my invention. Fig. 2 is a detail view of the heater unit shown in Fig. 1, in a preliminary stage of its construction. Figs. 3 and 4 are, respectively, a side elevation and an end view of the heater unit shown in Fig. 1. Figs. 5, 6 and 7 are detail views of the reducing bushing shown in Fig. 1.

Referring to the accompanying drawing, the device therein shown comprises a receiving member or holder 1, a reducing bushing 2, a heater unit 3, a soldering tip 4, a tubular shaft member 5, a terminal member 6 and an insulating handle 7.

The receiving member or holder 1 is substantially tubular in form and is tapered slightly toward its inner end for a purpose to be hereinafter described.

The reducing bushing or so-called "adapter" 2, comprises a body portion 8 and a neck portion 9. The body portion 8 is provided with a large centrally located recess $8^a$ and a longitudinally disposed slot or keyway 10, the outer end 11 of said body portion being slightly reduced in diameter in order to fit within the inner end of the receiving member 1, to which it is secured by a fusing process or otherwise. Furthermore, a recess 12 is provided in one side of the end portion 11 for a purpose to be hereinafter set forth.

One end of the tubular shaft member 5 fits tightly over the hollow neck portion 9 of the adapter 2 and is suitably secured thereto, while the other end of the tubular member 5 constitutes the body portion of the terminal member 6, to which the external connections are made.

Inasmuch as the structural details of the terminal member 6 form no part of my invention, no detailed description of the same is considered necessary. Any suitable terminal member may be employed, although I prefer a structure similar to that shown and described in detail in my co-pending application, Serial No. 568,871, filed June 25, 1910, and assigned to the Westinghouse Electric & Manufacturing Company.

The insulating handle 7, having a recess 13 to accommodate the terminal member 6 and its necessary connections, and an end opening 14 through which a multi-conductor service cable 15 extends, is adapted to be secured to the tubuar shaft member 5 in a well-known manner, and may be readily removed.

The heater unit 3 is substantially tubular in form and may be of any suitable construction, although I prefer a unit which comprises a plurality of rows of resistance wire 16 of the zig-zag type which is disposed between layers of insulating materials 17 and suitable sheet metal plates 18. Having assembled the unit as described, it is subjected to a considerable pressure, and the outer edges of the plates 18 are fused together in a well-known manner, thereby providing a self-contained and durable unit. Moreover, each side plate 18 is provided with a relatively narrow projecting portion 19 in order to form a protecting sheath 20 for a plurality of heater unit leads 21. After the heater unit 3 is in the form shown in Fig. 2, it is fashioned into its final tubular form, as shown in Figs. 1, 3 and 4. The completed heater unit 3 may then be inserted into the tapered receiving member 1, care being exercised to dispose the incased leads 21 in the recess 12 of the reducing bushing 2. The leads 21 are suitably insulated from one another and are conducted through the reducing bushing 2 and the tubular shaft member 5 to the terminal member 6, to which they are connected.

The soldering tip 4 comprises the tip proper 22 and a shank body member 23 which is tapered slightly toward its inner end to correspond to the taper of the receiving member 1. It will be observed that the inner end or base 24 of the shank 23 is tapered considerably, in order to provide room for the extended protecting sheath 20 of the heater unit 3.

Having properly disposed the heater unit 3 within the receiving member or holder 1, the soldering tip 4 is inserted and driven in, in such manner that considerable pressure is exerted upon the entire heater unit and the tip 4 is rigidly secured in position. It will be observed that the inner end or base 24 of the soldering tip 4 projects slightly into coöperative relationship with the slot or key-way 10 for a purpose to be hereinafter explained.

Assuming the various component parts of the device to occupy the positions shown, the soldering tip 4 and heater unit 3 may be readily removed, as follows: It is first advisable to detach the handle 7 and to disconnect the heater unit leads 21 from the terminal member 6, in order that said leads may not be broken when the soldering tip 4 is released. A suitable key or wedge (not shown) is then inserted into the key-way 10, whence the tapered shank of the soldering tip 4 may be easily released, according to a well-known practice, after which the soldering tip 4 and heater unit 3 may be withdrawn.

While I have illustrated and described an electric soldering iron of specific structure, those skilled in the art will readily understand that various modifications in the arrangement and location of parts may be effected without departing from the spirit of my invention, and I desire that only such limitations shall be imposed as are indicated in the appended claims.

I claim as my invention:

1. An electric soldering iron comprising a tapered receptacle open at the outer end, a suitable handle secured to said receptacle, a heater unit of substantially tubular form disposed within said receptacle, and a tapered member of good heat-conducting material adapted to be driven into said heater unit, whereby pressure upon said unit is produced.

2. In an electric soldering iron, the combination with a tapered shell, and a tubular heater unit fitted therein, of a tapered working member adapted to be secured within said shell and to effect a pressure on said heater unit.

3. In an electric soldering iron, the combination with a tapered shell and a heater unit removably disposed therein, of a member of good heat-conducting material adapted to be forced into said shell in intimate contact with said heater unit and to maintain a pressure thereon.

4. In an electric soldering iron, the combination with a tapered receiving member, a heater unit removably disposed therein and a soldering tip fitted tightly within said heater unit, of wedging means for securing said tip in position and for exerting a considerable pressure on said heater unit.

5. In an electric soldering iron, the combination with a supporting member having a tapered receiving chamber, a thin heater unit adapted to line said chamber, and a soldering tip disposed within said chamber and adapted to make intimate contact with said heater unit, of wedging means for holding said tip in position and for maintaining a pressure on said heater unit.

6. The combination with a supporting member having a receiving chamber, a thin heater unit lining said chamber, and a removable member of good heat-conducting material adapted to be driven into said receiving chamber within said heater unit, of means fixedly disposed in said supporting member for releasing said removable member from said receiving chamber.

7. The combination with a supporting member having a tapered receiving chamber, a thin heater unit lining said chamber, and a tapered member adapted to be driven into said receiving chamber within said heater unit, of a constant opening or keyway through the sides of said supporting member for the purpose of releasing said tapered member from said supporting member.

8. In an electric soldering iron, the combination with a receiving member, a soldering tip adapted to be forced into said receiving member, and a heater unit adapted to make intimate contact with said soldering tip, of means fixedly disposed in said receiving member for removing said tip therefrom.

9. In an electric soldering iron, the combination with a supporting member having a deep tapered cylindrical receiving chamber, a thin incased heater unit wrapped into tubular form and adapted to line the sides of said receiving chamber, and a removable soldering tip having a long tapered shank adapted to be forced within said tubular heater unit, of means associated with said supporting member for removing said soldering tip.

10. The combination with a supporting member having an opening or key-way therethrough, a suitable handle therefor, a thin tubular heater unit disposed within said supporting member, the leads of said heater unit being disposed within said handle, and a removable soldering tip having a long tapered shank adapted to be intimately associated with said heater unit and to maintain the same under pressure.

11. An electric soldering iron comprising a receiving shell, a heater unit wrapped in the form of a hollow cylinder and disposed therein, a tapered soldering tip disposed within said cylindrical heater unit, means for removing said soldering tip, a hollow shaft member attached to said receiving shell, a terminal member associated with said shaft member, and an insulating handle secured to said shaft member and inclosing said terminal member.

12. In an electric soldering iron, the combination with a tapered supporting member, and a heater unit disposed therein, of a tapered soldering tip removably fitted into said supporting member and in intimate contact with said heater unit.

13. In an electric soldering iron, the combination with a tapered receiving member open at the outer end, and a heater unit, of a tapered member of good heat-conducting material disposed within said receiving member.

14. In an electric soldering iron, the combination with a tapered receiving member and a heater unit disposed therein, of a tip member having a tapered portion removably disposed within said heater unit.

In testimony whereof, I have hereunto subscribed my name this 29th day of March, 1911.

WILLIAM S. HADAWAY, Jr.

Witnesses:
M. H. LEARY,
T. D. MONTGOMERY.